(12) United States Patent
Fryer et al.

(10) Patent No.: US 10,248,493 B2
(45) Date of Patent: Apr. 2, 2019

(54) INVARIANT DETERMINATION

(71) Applicant: HEWLETT PACKARD ENTERPRISE DEVELOPMENT LP, Houston, TX (US)

(72) Inventors: Daniel Fryer, Palo Alto, CA (US); James Park, Palo Alto, CA (US); Haris Volos, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 96 days.

(21) Appl. No.: 15/581,882

(22) Filed: Apr. 28, 2017

(65) Prior Publication Data

US 2018/0314574 A1 Nov. 1, 2018

(51) Int. Cl.
*G06F 11/00* (2006.01)
*G06F 11/07* (2006.01)

(52) U.S. Cl.
CPC .......... *G06F 11/079* (2013.01); *G06F 11/073* (2013.01); *G06F 11/0787* (2013.01)

(58) Field of Classification Search
CPC ... G06F 11/073; G06F 11/0787; G06F 11/079
See application file for complete search history.

(56) References Cited

U.S. PATENT DOCUMENTS

| 8,510,596 | B1 | 8/2013 | Gupta et al. |
| 9,535,836 | B2 | 1/2017 | Chakrabarti et al. |
| 2006/0265438 | A1 | 11/2006 | Shankar et al. |
| 2007/0083792 | A1* | 4/2007 | McDermott ........ G06F 11/0742 714/20 |
| 2012/0179650 | A1 | 7/2012 | Vechev |
| 2015/0355981 | A1* | 12/2015 | Booss ................. G06F 11/1474 707/674 |
| 2016/0342351 | A1 | 11/2016 | Li et al. |
| 2017/0123879 | A1* | 5/2017 | Donlin ................ G06F 11/0727 |

OTHER PUBLICATIONS

Coburn et al., "NV-Heaps: Making Persistent Objects Fast and Safe with Next-Generation. Non-Volatile Memories," ASPLOS '11, 2011 (13 pages).

* cited by examiner

*Primary Examiner* — Joshua P Lottich
(74) *Attorney, Agent, or Firm* — Hewlett Packard Enterprise Patent Department

(57) ABSTRACT

Examples disclosed herein relate to determining that an operation is accessing data on a persistent memory and retrieving a log of the operation. The examples may also include determining a type of the data being accessed by the persistent memory by the operation and identifying, from the log, a location in the persistent memory of the data accessed by the operation. The examples may also include determining contents of the data accessed by the persistent memory by the operation and determining whether the contents of the data hold an invariant corresponding to the type of data.

20 Claims, 4 Drawing Sheets

INVARIANT DETERMINATION

BACKGROUND

Persistent memory enables programs to persist in-memory data structures directly on byte-addressable non-volatile memory (NVM) for low latency. However, this may lead to data structures being more susceptible to software failures that accidentally corrupt the state of the data structure.

BRIEF DESCRIPTION OF THE DRAWINGS

The following detailed description references the drawings, wherein.

DETAILED DESCRIPTION

With persistent memory, programs can persist in-memory data structures directly on byte-addressable non-volatile memory (NVM). An application persists data directly on NVM as it creates and modifies in-memory data structures, and the application continues to have access to the persisted data after system restart. The benefit is flexible and low-latency persistence.

However, as modification of durable state is done through regular load/store memory instructions, durable state may be more susceptible to software failures that accidentally corrupt such state. Applications that rely on pointer integrity may do so within in-memory heap objects. Corruption of the memory heap (accidental or malicious) may lead to application crashes or serious security vulnerabilities.

Systems and methods for invariant verification described herein provide a framework that enables programmers to express key memory-safety invariants, such as no object overlap, correspondence between allocator and pointers, and reference counts. The framework may check and enforce such invariants either at recovery time, or at runtime at specific points where consistent invariants are expected to hold true such as at transaction commits.

Systems and methods for invariant verification described herein may use log files as a failsafe. For example, operations may be split into transactions and before any transaction is performed, the transaction may be committed to the log. After each transaction belonging to a given operation is committed to the log, then the operation may be performed. In the case of a failure, such as a power outage, the log can be referenced. Techniques for invariant verification may leverage this log. Specifically, invariants may be checked for transaction in the log after transactions have been committed to the log, but before the operation has been performed.

A method for invariant determination may include determining that an operation is accessing data on a persistent memory and retrieving a log of the operation. The method may also include determining a type of the data being accessed by the persistent memory by the operation and identifying, from the log, a location in the persistent memory of the data accessed by the operation. The method may also include determining contents of the data accessed by the persistent memory by the operation and determining whether the contents of the data hold an invariant corresponding to the type of data.

Figure 1:
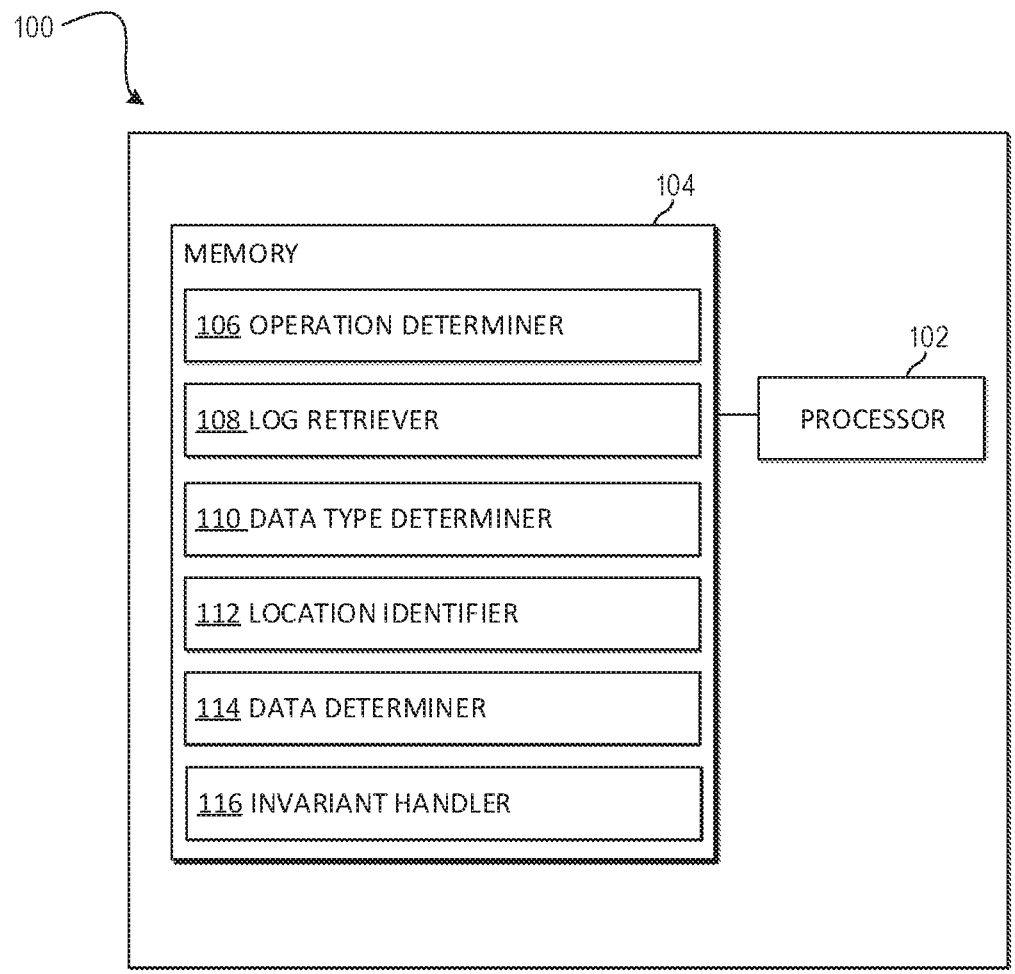
FIG. 1 is a block diagram of an example system for invariant determination.

FIG. 1 is a block diagram of an example system 100 for invariant determination. System 100 may include a processor 102 and a memory 104 that may be coupled to each other through a communication link (e.g., a bus). Processor 102 may include a single or multiple Central Processing Units (CPU) or another suitable hardware processor(s). In some examples, memory 104 stores machine readable instructions executed by processor 102 for system 100. Memory 104 may include any suitable combination of volatile and/or non-volatile memory, such as combinations of Random Access Memory (RAM), Read-Only Memory (ROM), flash memory, and/or other suitable memory.

Memory 104 stores instructions to be executed by processor 102 including instructions for operation determiner 106, log retriever 108, data type determiner 110, location identifier 112, data determiner 114, invariant handler 116 and/or other components. According to various implementations, system 100 may be implemented in hardware and/or a combination of hardware and programming that configures hardware. Furthermore, in FIG. 1 and other Figures described herein, different numbers of components or entities than depicted may be used.

System 100 may implement a software-based resilience solution to tolerate software bugs and failures that accidentally corrupt durable state stored in NVM. The solution may leverage the invariant relationships between data structure and the transactional nature of crash consistency mechanisms for NVM.

Some invariants may be generic (e.g. if a pointer of some type is non-null, the pointer points to an object of that type, or that no writes stray outside of allocated memory), some invariants may be specific to a particular data structure (e.g. that a linked list is free of cycles), and some invariants may be specific to the program itself (e.g. that a data element in one structure has a valid reference to a data element in another structure).

From these invariants (which may apply to the whole memory heap), system 100 may derive assertions that apply when one or more objects on the heap are modified. These assertions may be used to verify that the invariants hold after the given modifications occur.

Processor 102 may execute operation determiner 106 to determine that an operation is writing data to a persistent memory. The operation may be part of a program. In some aspects, the original program code may be modified so that its persistent memory allocations are annotated by the type of the object they are allocating. In some programming languages the object type may be implicit because allocation carries type information. Either way, the type information may be used to determine which invariants should be checked when memory is written to, as well as to check invariants concerning the types of objects at a given address.

The original program code may also be automatically instrumented so that all stores to persistent memory are logged. This log may be used to order and detect the changes effected by a transaction.

Processor 102 may execute log retriever 108 to retrieve a log of the operation. Each write to persistent memory may be added to the log by program code associated with the operation.

Processor 102 may execute data type determiner 110 to determine a type of the data being written to the persistent memory by the operation. The type of data may be allocated to the persistent memory by a memory allocator. Data types may include hash tables, linked lists, etc.

For example, data type determiner 110 may identity persistent data structures in the original program. These structures may encompass the scope of objects that may be statically or dynamically allocated in persistent memory. Data type determiner 110 may enumerate the structures or types in a way that allows annotations and invariants to refer to their types and fields through symbolic constants. For example, operation determiner 110 may create a list of names structure types, each with a distinct integer value assigned to it. Each structure may be associated with a list of fields, each with a distinct integer assigned to it, and information about types and offsets for the log parsing to turn a log entry from "address, value" into "struct type, field, value".

Processor 102 may execute location identifier 112 to identify, from the log, a location in the persistent memory of the data written by the operation. Processor 102 may execute data determiner 114 to determine contents of the data written in the persistent memory by the operation. In some aspects, the contents of the data include a structure and data determiner 114 may further identify the structure in a program code associated with the operation.

Data determiner 114 may translate the addresses of writes (found in the log) into the identifiers of fields and structures by using metadata recorded at allocation time. These field identifiers may determine which invariants are checked. For example, the invariants may be selected on the type of data identified (i.e. as described above in reference to data type determiner 110). In other words, each data type may be associated with a set of invariants. Accordingly, once that data type is identified, each invariant associated with the data type may be checked. In one example, a type of data may include a dictionary implemented as a hash table. An invariant associated with this data type may be that is that each entry stored in the table must be placed in the right slot as determined by the hash of its key.

In some aspects, the invariant is provided by the programmer, and the framework associates it with certain fields of the dictionary. When the framework detects a change to these certain fields (e.g., size, key), the system may verify that the invariant holds.

The invariants may take into account the new value of the field, the old value of the field, the type of the enclosing structure, an array index if the field is a member or submember of an array, current values of other fields in the same structure, other writes in the same transaction, metadata recorded per allocated object (i.e. type, size) and/or other structures accessed either through some global mechanism or through references from the modified structure.

Processor 102 may execute invariant handler 116 to determine whether the contents of the data hold an invariant corresponding to the type of data. The invariant may be based on at least one of a data type of the structure or a current value of a field in the structure other than the contents. The invariant may be based on at least one of a new value of a data field corresponding to the location or an old value of the data field corresponding to the location. The invariant may be a local invariant corresponding to the contents of the data written in the persistent memory by the operation and the local invariant may be adapted from a global invariant corresponding to the type of the data being written to the persistent memory by the operation. In other words, a global invariant holds over the entire state of a data structure, as opposed to a local invariant which is localized to the data changed by the operation. Building on the dictionary example described above in reference to data determiner 114, a global invariant may be each entry stored in the table must be placed in the right slot as determined by the hash of its key. The local invariant adapted from this global invariant may specify, for example, a specific table, slot, hash and/or key in memory that should follow the invariant.

In some aspects, the operation may be a first operation that is part of a transaction and the invariant may be based on a second operation that is also part of the transaction.

Invariant checking may not occur when the write to persistent memory happens, but possibly at a later point in time. In other words, invariant handler 116 may determine whether the contents of the data hold an invariant corresponding to the type of data at certain consistency points. As used herein, a consistency point refers to when all threads reach a transaction commit point. Checking the invariants while a transaction is in progress may result in a "false positive", as transactions are allowed to (and sometimes, may have to) violate invariants temporarily.

The invariant handler 116 may allow the operation to proceed when it is determined that the invariant is held. The invariant handler 116 may abort the operation when it is determined that the invariant is not held.

Figure 2:
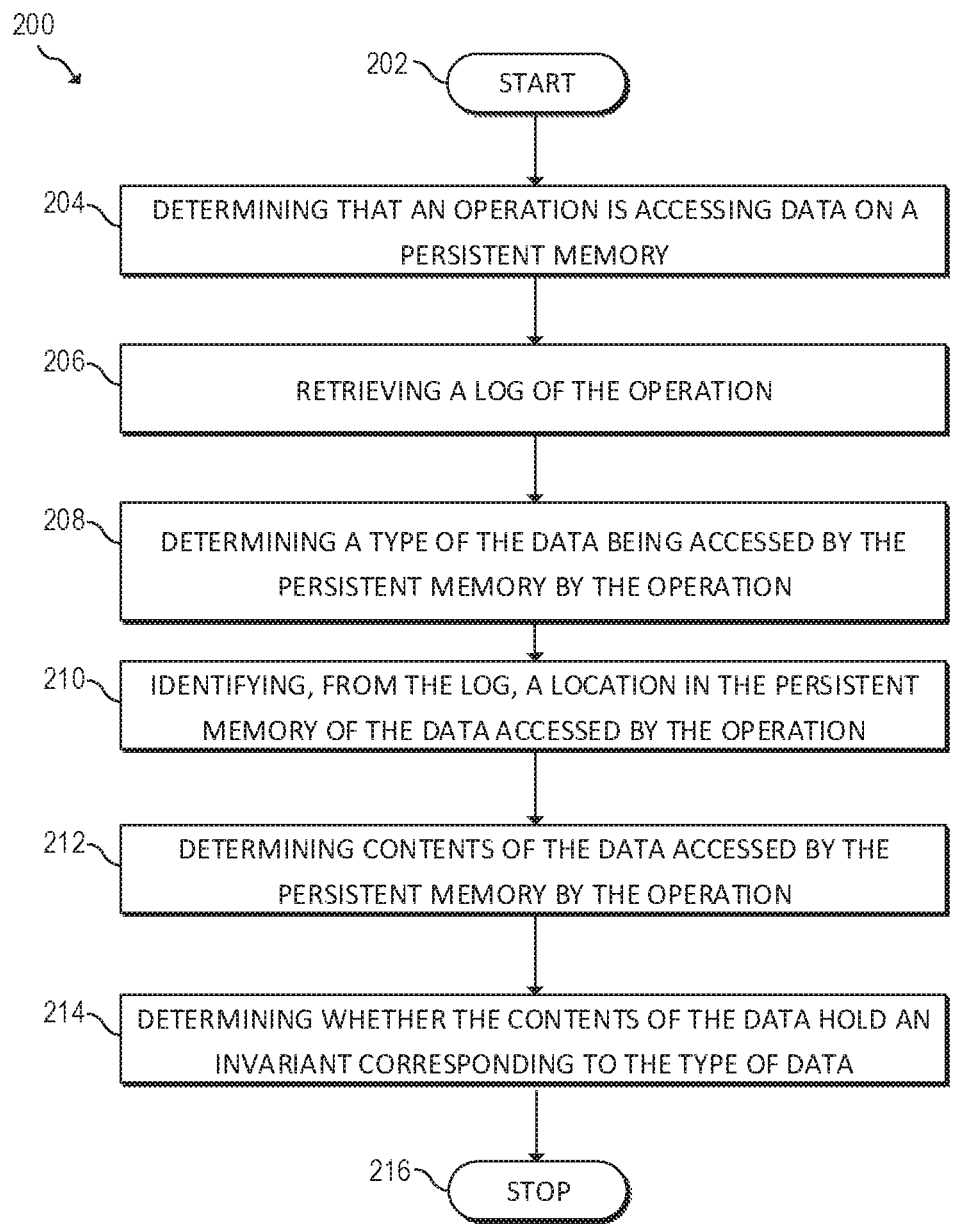
FIG. 2 is a flowchart of an example method for invariant determination.
Figure 3:
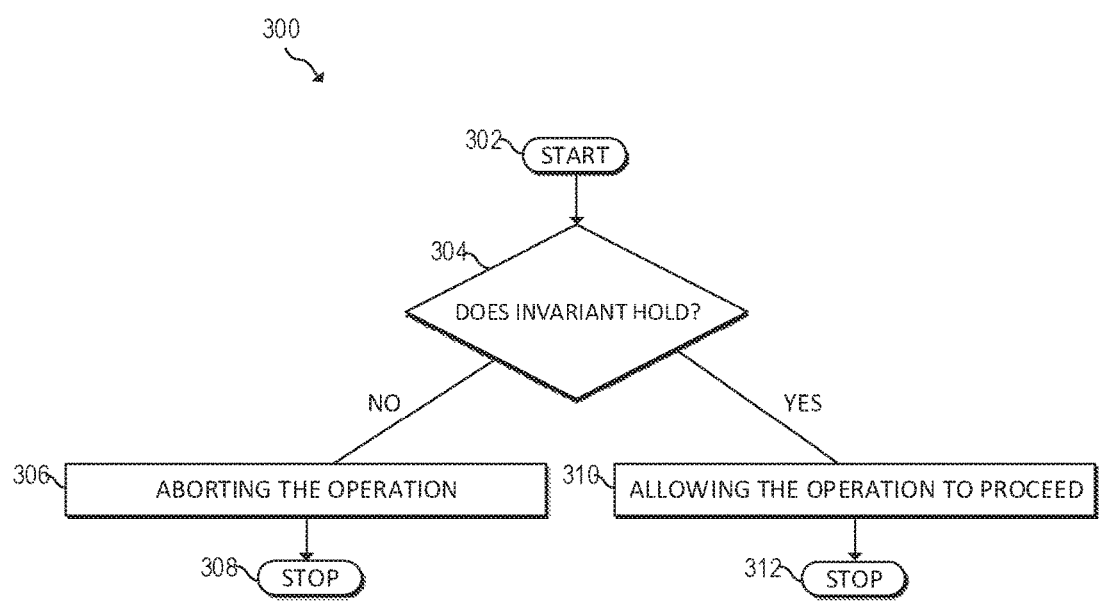
FIG. 3 is a flowchart of another example method for invariant determination.

Referring now to FIGS. 2-3, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flowchart of an example method 200 for invariant determination. Method 200 may start at block 202 and continue to block 204, where the method 200 may include determining that an operation is accessing data on a persistent memory. At block 206, the method may include retrieving a log of the operation. At block 208, the method may include determining a type of the data being accessed by the persistent memory by the operation. The type of data may be allocated to the persistent memory by a memory allocator.

At block 210 the method may include identifying, from the log, a location in the persistent memory of the data accessed by the operation. Each write to persistent memory may be added to the log by program code associated with the operation. At block 212 the method may include determining contents of the data accessed by the persistent memory by the operation. In some aspects, the contents of the data include a structure and the method may include identifying the structure in a program code associated with the operation.

At block 214, the method may include determining whether the contents of the data hold an invariant corresponding to the type of data. The invariant may be based on at least one of a data type of the structure or a current value of a field in the structure other than the contents. The invariant may be based on at least one of a new value of a data field corresponding to the location or an old value of the data field corresponding to the location. The invariant may be a local invariant corresponding to the contents of the data written in the persistent memory by the operation and the local invariant may be adapted from a global invariant corresponding to the type of the data being written to the persistent memory by the operation. In some aspects, the operation may be a first operation that is part of a transaction and the invariant may be based on a second operation also part of the transaction. The method may continue to block 216, where the method may end.

As described above, the method may include determining whether the contents of the data hold an invariant corresponding to the type of data. This is discussed in further detail below in regards to FIG. 3.

FIG. 3 is a flowchart of an example method 300 for invariant determination. Method 300 may start at block 302 and continue to block 304, where the method 300 may include determining whether the contents of the data hold an invariant corresponding to the type of data.

If it is determined that the invariant is not held (NO branch of block 304), at block 306, the method may involve aborting the operation. The method may continue to block 308, where the method may end. If it is determined that the invariant is held (YES branch of block 304), at block 310, the method may involve allowing the operation to proceed. The method may continue to block 312, where the method may end.

Figure 4:
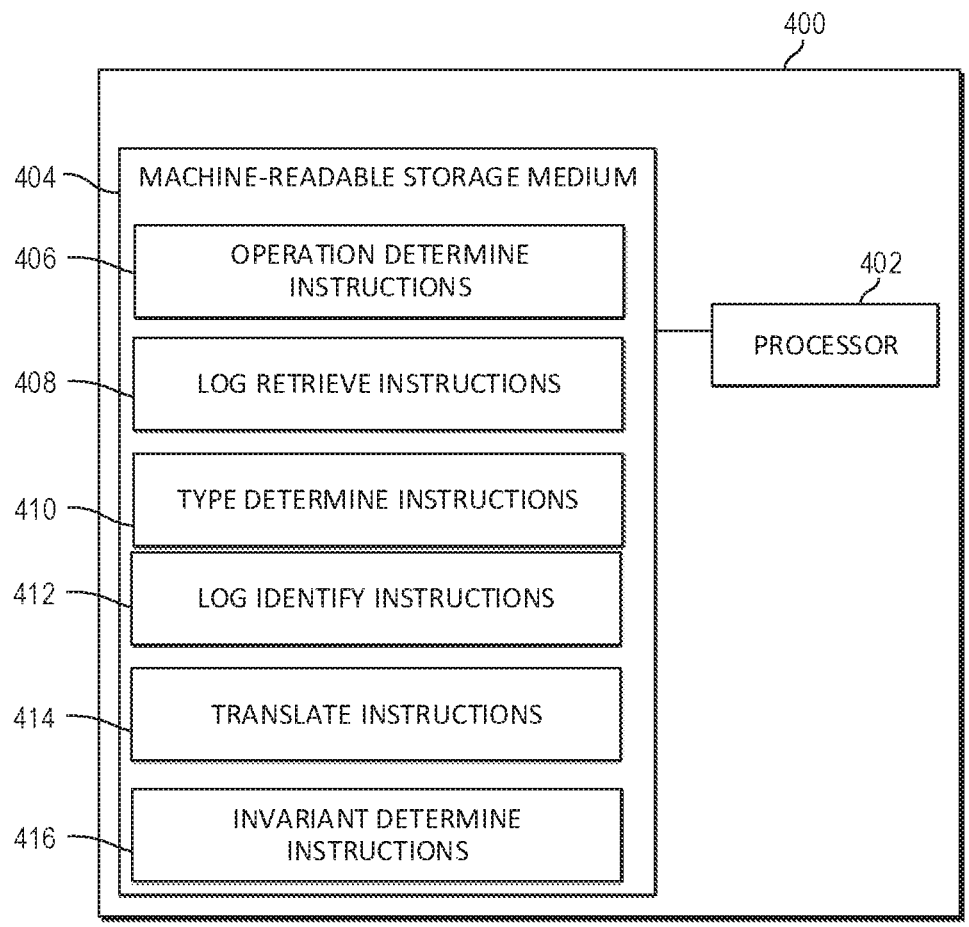
FIG. 4 is a flowchart of another example system for invariant determination.

FIG. 4 is a block diagram of an example system 400 for invariant determination. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412, 414 and 416 to invariant determination. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup.

The machine-readable storage medium may be non-transitory. Referring to FIG. 4, operation determine instructions 406, when executed by a processor (e.g., 402), may cause system 400 to determine that an operation is writing data to a persistent memory. Log retrieve instructions 408, when executed by a processor (e.g., 402), may cause system 400 to retrieve a log of the operation. Each write to persistent memory may be added to the log by program code associated with the operation.

Type determine instructions 410, when executed by a processor (e.g., 402), may cause system 400 to determine a type of the data being written to the persistent memory by the operation. The type of data may be allocated to the persistent memory by a memory allocator.

Log identify instructions 412, when executed by a processor (e.g., 402), may cause system 400 to identify, from the log, a location in the persistent memory of the data written by the operation. Translate instructions 414, when executed by a processor (e.g., 402), may cause system 400 to translate the location of the operation into an identifier of the data being written to the persistent memory. In some aspects, the contents of the data include a structure and data determiner 114 may further identify the structure in a program code associated with the operation. Invariant determine instructions 416, when executed by a processor (e.g., 402), may cause system 400 to determine whether the data holds an invariant corresponding to the type of data. If it is determined that the invariant does not hold, invariant determine instructions 416 may cause system 400 to abort the operation when it is determined that the invariant is not held. If it is determined that the invariant does hold, invariant determine instructions 416 may cause system 400 to allow the operation to be performed.

The invariant may be based on at least one of a data type of the structure or a current value of a field in the structure other than the contents. The invariant may be based on at least one of a new value of a data field corresponding to the location or an old value of the data field corresponding to the location. The invariant may be a local invariant corresponding to the contents of the data written in the persistent memory by the operation and the local invariant may be adapted from a global invariant corresponding to the type of the data being written to the persistent memory by the operation. In some aspects, the operation may be a first operation that is part of a transaction and the invariant may be based on a second operation also part of the transaction.

The foregoing disclosure describes a number of examples for invariant determination. The disclosed examples may include systems, devices, computer-readable storage media, and methods for invariant determination. For purposes of explanation, certain examples are described with reference to the components illustrated in FIGS. 1-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
    determining that an operation is accessing data on a persistent memory;
    retrieving a log of the operation;
    determining a type of the data being accessed by the persistent memory by the operation;
    identifying, from the log, a location in the persistent memory of the data accessed by the operation;
    determining contents of the data accessed by the persistent memory by the operation; and
    determining whether the contents of the data hold an invariant corresponding to the type of data.

2. The method of claim 1, wherein a memory allocator annotates the type of data allocated to the persistent memory.

3. The method of claim 1, wherein a program code associated with the operation adds each write to persistent memory to the log.

4. The method of claim 1, comprising:
    aborting the operation when it is determined that the invariant is not held.

5. The method of claim 1, comprising:
    allowing the operation to proceed when it is determined that the invariant is held.

6. The method of claim 1, wherein the contents of the data include a structure, the method comprising:
    identifying the structure in a program code associated with the operation.

7. The method of claim 1, wherein the invariant is based on at least one of a data type of the structure or a current value of a field in the structure other than the contents.

8. The method of claim 1, wherein the invariant is based on at least one of a new value of a data field corresponding to the location or an old value of the data field corresponding to the location.

9. The method of claim 1, wherein the operation is a first operation that is part of a transaction and the invariant is based on a second operation part of the transaction.

10. The method of claim 1, wherein the invariant is a local invariant corresponding to the contents of the data written in the persistent memory by the operation and the local invariant is adapted from a global invariant corresponding to the type of the data being written to the persistent memory by the operation.

11. A system comprising:
    a memory storing a plurality of instructions; and
    a hardware processor configured to execute the plurality of instructions, the hardware processor, when executing the plurality of instructions, is configured to operate as:
        an operation determiner to determine that an operation is writing data to a persistent memory;
        a log retriever to retrieve a log of the operation;
        a data type determiner to determine a type of the data being written to the persistent memory by the operation;
        a location identifier to identify, from the log, a location in the persistent memory of the data written by the operation;
        a data determiner to determine contents of the data written in the persistent memory by the operation; and
        an invariant handler to determine whether the contents of the data hold an invariant corresponding to the type of data.

12. The system of claim 11, wherein
    the invariant handler aborts the operation when it is determined that the invariant is not held.

13. The system of claim 11, wherein
    the invariant handler allows the operation to proceed when it is determined that the invariant is held.

14. The system of claim 11, wherein the type of data is allocated to the persistent memory by a memory allocator.

15. The system of claim 11, wherein each write to persistent memory is added to the log by program code associated with the operation.

16. A non-transitory machine-readable storage medium encoded with instructions, the instructions executable by a processor of a system to cause the system to:
    determine that an operation is writing data to a persistent memory;
    retrieve a log of the operation;
    determine a type of the data being written to the persistent memory by the operation;
    identify, from the log, a location in the persistent memory of the data written by the operation;
    translate the location of the operation into an identifier of the data being written to the persistent memory; and
    determine whether the data holds an invariant corresponding to the type of data.

17. The non-transitory machine-readable storage medium of claim 16, comprising instructions to
    translate the location using metadata recorded by an allocator that allocates locations to the persistent memory.

18. The non-transitory machine-readable storage medium of claim 16, comprising instructions to:
    identify a structure in a program code associated with the operation, the structure enclosing the data.

19. The non-transitory machine-readable storage medium of claim 18, wherein the invariant is based on at least one of a data type of the structure or a current value of a field in the structure other than the data.

20. The non-transitory machine-readable storage medium of claim 16, wherein the invariant is based on at least one of a new value of a data field corresponding to the location or an old value of the data field corresponding to the location.

* * * * *